(12) United States Patent
Vronay et al.

(10) Patent No.: US 8,447,775 B2
(45) Date of Patent: May 21, 2013

(54) DATABASE QUERY USER INTERFACE TO ASSIST IN EFFICIENT AND ACCURATE QUERY CONSTRUCTION

(75) Inventors: David P. Vronay, Beijing (CN); Cezary Marcjan, Redmond, WA (US); Andrzej Turski, Redmond, WA (US); Ryszard Kott, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2829 days.

(21) Appl. No.: 10/461,832

(22) Filed: Jun. 13, 2003

(65) Prior Publication Data
US 2004/0254928 A1  Dec. 16, 2004

(51) Int. Cl.
*G06F 17/30* (2006.01)

(52) U.S. Cl.
USPC ............ 707/765; 707/722; 707/766; 707/767

(58) Field of Classification Search
USPC .. 707/200, 202, 722, 765, 766, 767; 715/853, 715/854, 855
See application file for complete search history.

(56) References Cited

U.S. PATENT DOCUMENTS

| | | | | |
|---|---|---|---|---|
| 4,829,423 A * | 5/1989 | Tennant et al. | | 704/8 |
| 5,454,106 A | 9/1995 | Burns et al. | | |
| 5,584,024 A * | 12/1996 | Shwartz | | 1/1 |
| 5,619,688 A | 4/1997 | Bosworth et al. | | |
| 5,778,357 A | 7/1998 | Kolton et al. | | |
| 5,787,275 A | 7/1998 | Li | | |
| 5,802,512 A * | 9/1998 | Wallack | | 1/1 |
| 6,014,669 A | 1/2000 | Slaughter et al. | | |
| 6,016,488 A | 1/2000 | Bosworth et al. | | |
| 6,078,916 A * | 6/2000 | Culliss | | 707/5 |
| 6,338,055 B1 * | 1/2002 | Hagmann et al. | | 1/1 |
| 6,356,887 B1 | 3/2002 | Berenson et al. | | |
| 6,430,563 B1 | 8/2002 | Fritz et al. | | |
| 6,477,534 B1 * | 11/2002 | Acharya et al. | | 707/100 |
| 6,487,553 B1 * | 11/2002 | Emens et al. | | 1/1 |

(Continued)

FOREIGN PATENT DOCUMENTS

| | | |
|---|---|---|
| JP | 59176823 | 10/1984 |
| JP | 6019965 | 1/1994 |

(Continued)

OTHER PUBLICATIONS

Internatiotial Search Report dared Nov. 10, 2005 mailed Nov. 28, 2005 for PCT Application Serial No. PCT/US04/18503. 3 Pages.

(Continued)

*Primary Examiner* — Mahesh Dwivedi
(74) *Attorney, Agent, or Firm* — Lee & Hayes, PLLC

(57) ABSTRACT

A database query user interface combines the user convenience of simple text searching with the expressive refinements of powerful query language. The database query user interface includes a query text string input from a user including one or more terms of a chunk expression language format. The database query user interface further includes a syntactical prompt for constructing a multi-element chunk expression language database query that is syntactically correct and complete and includes the text string input from the user. For example, the syntactical prompt is selected from the database based upon a weighted analysis of database information relating to database elements included in the text string input from the user. A database query formed according to the present user interface may then be persisted or stored as a database query object.

47 Claims, 6 Drawing Sheets

U.S. PATENT DOCUMENTS

| | | | |
|---|---|---|---|
| 6,564,213 B1 * | 5/2003 | Ortega et al. | 707/5 |
| 2001/0021929 A1 | 9/2001 | Lin et al. | |
| 2002/0069086 A1 * | 6/2002 | Fracek et al. | 705/2 |
| 2003/0088554 A1 * | 5/2003 | Ryan et al. | 707/3 |
| 2003/0188260 A1 * | 10/2003 | Jensen et al. | 715/505 |
| 2004/0068489 A1 * | 4/2004 | Dettinger et al. | 707/3 |
| 2004/0073625 A1 * | 4/2004 | Chatani | 709/217 |
| 2004/0083213 A1 * | 4/2004 | Wu et al. | 707/4 |

FOREIGN PATENT DOCUMENTS

| | | |
|---|---|---|
| JP | 6290221 | 10/1994 |
| JP | 9091309 | 4/1997 |
| JP | 9510565 | 10/1997 |
| JP | 10116173 | 5/1998 |
| JP | 2002123544 | 4/2002 |
| JP | 2002230005 | 8/2002 |
| JP | 2002245080 | 8/2002 |
| JP | 2003016089 | 1/2003 |
| JP | 2003503798 | 1/2003 |
| JP | 2003162531 | 6/2003 |
| WO | WO0180079 | 10/2001 |

OTHER PUBLICATIONS

The Chinese Office Action mailed Jun. 10, 2011 for Chinese patent application No. 200480016462.7, a counterpart foreign application of U.S. Appl. No. 10/461,832.

Hoshino, "Relational Database Full of the Defective Products", NICCEI BYTE, Japan, Apr. 1, 1990, No. 70, pp. 316 to 326.

Translated Japanese Office Action mailed Jan. 1, 2011 for Japanese Patent Application No. 2006-533698, a counterpart foreign application of U.S. Appl. No. 10/461,832.

The Korean Office Action mailed Jan. 27, 2012 for Korean patent application No. 10-2005-7023962, a counterpart foreign application of U.S. Appl. No. 10/461,832, 6 pages.

The Korean Office Action mailed Mar. 9, 2011 for Korean Patent Application No. 10-2005-7023962, a counterpart foreign application of U.S. Appl. No. 10/461,832.

Notice of Rejection from Japanese Patent Office for Application No. 2006-533698, mailed on Jun. 18, 2010 with English translation, 19 pgs.

Third Office Action from the Patent Office of the State Intellectual Property Office of the People's Republic of China for Application No. 200480016462.7, mailed on May 8, 2009, 21 pgs.

The Taiwan Office Action mailed Jan. 17, 2011 for Taiwanese Patent Application No. 93116919, a counterpart foreign application of U.S. Appl. No. 10/461,832.

"Visual Representation of Database Query Definition", IBM Technical Disclosure Bulletin, IBM Corp. New York, vol. 33, No. 9, Feb. 1, 1991, pp. 238-242.

Windows Media Player 9 Help; Microsoft Corporation; Jan. 7, 2003.

Zhang, et al., "Query formulation from high-level concepts for relational databases", User Interfaces to Data Intensive Systems, 1999, Proceedings Los Alamitos, CA, Sep. 5-6, 1999, IEEE Computer Society, USA, Sep. 5, 1999, pp. 64-74.

* cited by examiner

Fig. 14
Show all emails whose sender is 'manager' and recipients does not include 'mrs. manager'
Fig. 15
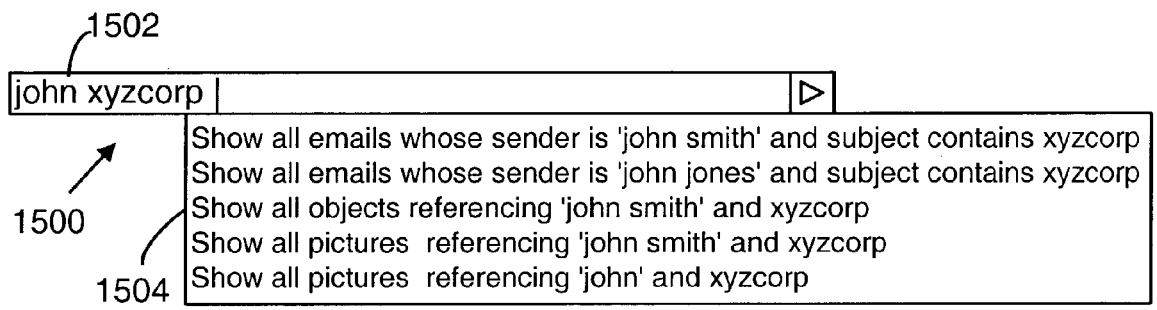
Fig. 16
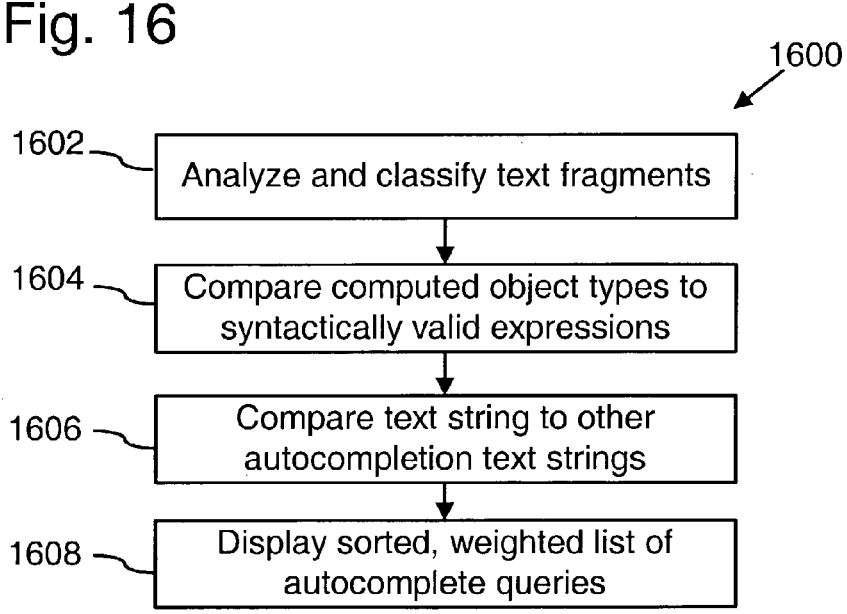

US 8,447,775 B2

DATABASE QUERY USER INTERFACE TO ASSIST IN EFFICIENT AND ACCURATE QUERY CONSTRUCTION

TECHNICAL FIELD

The present invention relates to user interfaces for building database queries and, in particular, to a database query user interface that includes syntactically correct prompting and persistent database query objects.

BACKGROUND AND SUMMARY OF THE INVENTION

A database can hold a tremendous amount of information. At any given time, a user will only want to see a subset of that information. Users select that subset by defining a query, which is a piece of text written in a query specification language, such as SQL. But because query specification languages are complex, they are typically not appropriate for end users. For end users, there are simpler languages such as chunk expression languages or simple full-text searching. Some simplified query languages are not expressive enough for users to develop queries with adequate refinements to access information from a database. Simplified query languages that are expressive enough are often as difficult to learn as a query specification language, and so are inappropriate for end users. Text searches are too inaccurate and return too many unrelated results to be useful.

Accordingly, the present invention provides a database query user interface that that combines the user convenience of simple text searching with the expressive refinements of powerful query languages. In one implementation, a database query user interface includes a query text string input from a user. The query text string has one or more terms of a chunk expression language format. A chunk expression language format is a pseudo-natural language (e.g., English-like, or like any other human language) that can be easily parsed by a computer into a formal query specification language, such as SQL. Simple chunk expressions were developed as early as 1986 in the HyperCard project of Apple Corporation. The SK8 authoring tool, also developed by Apple Corporation, provided a complete chunk expression language by 1988.

The database query user interface of the present invention further includes a syntactical prompt for constructing a multi-element chunk expression language database query that is syntactically correct and complete and includes the text string input from the user. For example, the syntactical prompt is selected from the database based upon a weighted analysis of database information relating to database elements included in the text string input from the user.

A database query formed according to the present user interface may then be persisted or stored as a database query object. Such an object allows a query to be refined, such as by a user adding or deleting items in a set of results returned by the query. Such additions or deletions, which are referred to as exceptions, may be stored with the query as a data structure. In some implementations, a revised database query in the chunk expression language format can be generated automatically to incorporate exceptions in the exception list, thereby refining the query and reducing resource requirements for maintaining and implementing the separate exceptions. The present invention provides, therefore, a database query user interface that combines the user convenience of conventional simple search languages with the expressiveness and refinements of powerful query specification languages.

Additional objects and advantages of the present invention will be apparent from the detailed description of the preferred embodiment thereof, which proceeds with reference to the accompanying drawings.

BRIEF DESCRIPTION OF THE DRAWINGS

FIG. 14 is an illustration of a modified query incorporating a suggested rewrite.

FIG. 15 is an illustration of a grammatical query autocomplete (GQA) user interface.

FIG. 16 is a flow diagram of a GQA is a grammatical query autocomplete (GQA).

DETAILED DESCRIPTION OF PREFERRED EMBODIMENTS

A conventional database system or database includes a collection of tables with record entries. Queries of the database are typically made using a query specification language, sometimes referred to as a data manipulation language, such as SQL. In addition, a full-text search engine can find records that contain text strings. A variety of commercially available databases are available, including Microsoft SQL available from Microsoft Corporation. The term database is used herein to refer generally to any "property store" that includes objects or files with searchable properties.

Figure 1:
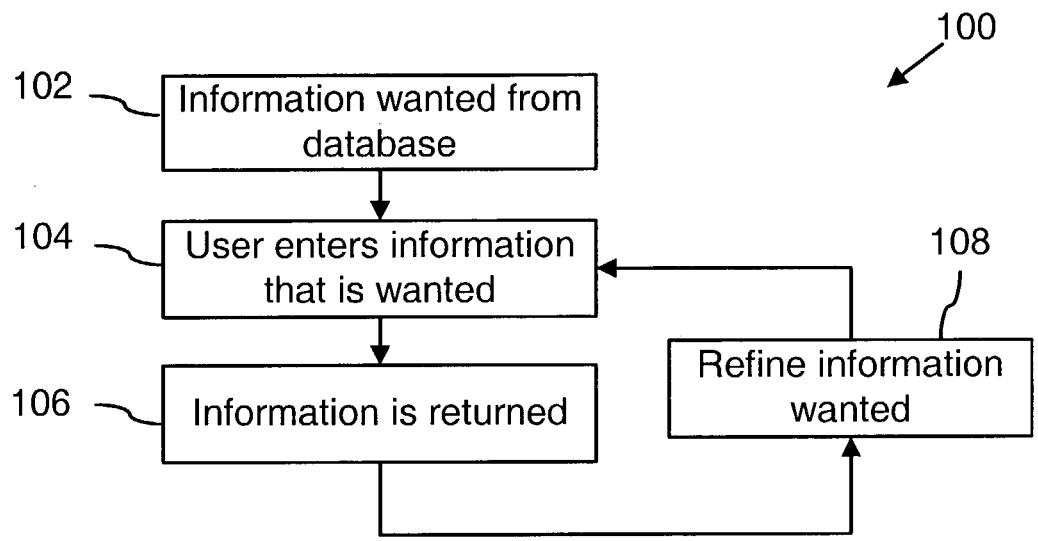
FIG. 1 is a flow chart of a simplified representation of a prior art database query sequence.

FIG. 1 is a flow chart of a simplified representation of a prior art database query sequence 100. In a step 102, a user determines that he or she wants particular information from a database. In a step 104, the user enters (e.g., types) into a computer system what information is wanted from the database. In a step 106 the computer system returns and displays the information that is wanted. In a return step 108, a user may refine the statement of what information is wanted from the database to more accurately obtain the information. The present invention provides improvements in conventional database query sequence 100, as described below in greater detail.

Figure 2:
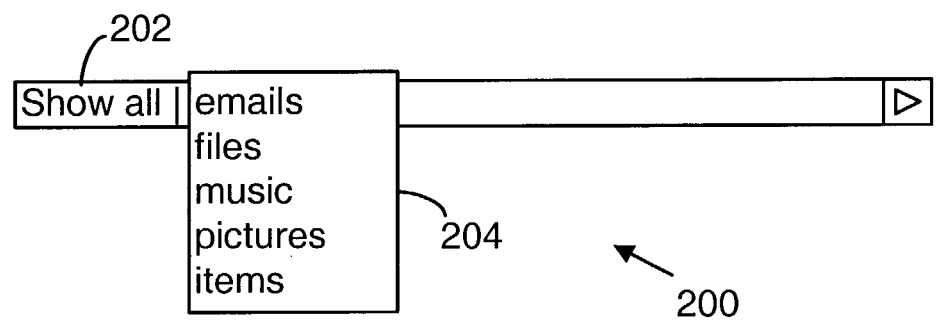
FIG. 2 is an illustration of a user interface that provides syntactical prompting for constructing an initial part of a database query in a chunk expression language format.

FIG. 2 is an illustration of a user interface 200 that provides syntactical prompting for constructing an initial part of a database query in a chunk expression language format. In particular, user interface 200 illustrates syntactical prompting for a single word.

As is known in the art, a chunk expression language format is a pseudo-natural language (e.g., English-like) that can be easily parsed by a computer into a formal query specification language, such as SQL. A sample chunk expression might be:

Show every email whose sender is 'John Smith' and whose subject contains "patent", which would be parsed by a computer into a formal query specification language, such as SQL as:

SELECT * FROM EMAIL WHERE SENDER='JOHN SMITH'
AND SUBJECT LIKE '%patent%'

In general, a chunk expression might take the form of:

Show <selector><object-type> whose <property> <comparator><value>
*[<conjunction><property><comparator><value>]

User interface 200 automatically prompts a user for a syntactically correct word from a set of all possible choices. This prevents the user from making syntax errors while beginning to enter chunk expressions. For example, if the user begins a chunk expression entry 202 by entering "show all", the user interface automatically determines that an object is the syntactically correct next entry. As a result, user interface 200 presents the user with a list 204, such as a drop-down listing as illustrated of all syntactically correct objects (e.g., email, files, music, pictures, items).

Such a simple single-part-of-speech completion is not uncommon, and can be found as part of the Intellisense™ technology in Microsoft Visual Studio .NET, for example, available from Microsoft Corporation. User interface 200 illustrates, however, only a first syntactical prompting step in aiding a user with construction of a query according to the present invention.

Figure 3:
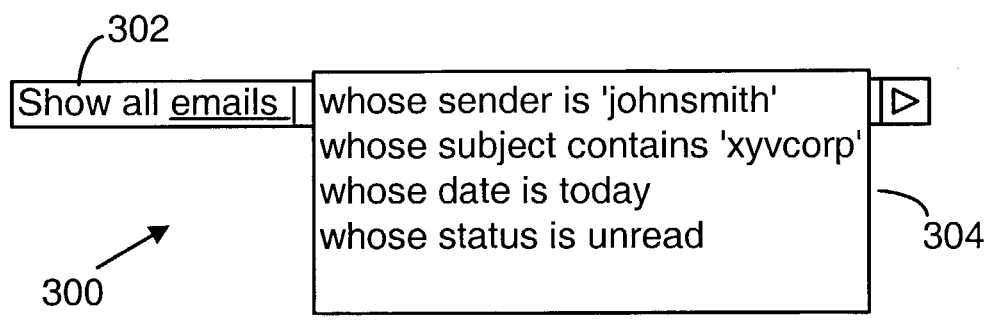
FIG. 3 is an illustration of a user interface to provide continued syntactical prompting for constructing a database query in a chunk expression language format following the initial step illustrated in FIG. 2.

FIG. 3 is an illustration of a user interface 300 to provide continued syntactical prompting for constructing a database query in a chunk expression language format following the initial step illustrated by user interface 200. User interface 300 provides suggestive promptings for entire syntactic groups, such as a completion for an entire property specification phrase, rather than a single word as in the initial prompting step of FIG. 2.

Based upon an initial chunk expression 302 formed from a user interface 200, for example, user interface 300 automatically prompts a user with a list 304 of complete, readable syntactically correct expressions to choose from. For example, based upon an initial chunk expression 302 of "show all email," the user interface automatically provides list 304 of complete, readable syntactically correct expressions such as: whose sender is 'John smith,' whose subject contains 'xyzcorp,' whose date is 'today,' or whose status is 'unread.'

As a result, user interface 300 operates as a completion routine that suggests complete, readable expressions so that the user is not left with a query having a syntactically invalid expression. For example, a system with conventional single word completion might complete "show all email whose" with a choice of "sender", "subject", "date", etc. If the user selects one of these words alone, the resulting chunk expression will be the phrase "show all email whose sender", which is not syntactically valid if evaluated or executed. In the user interface of FIGS. 2 and 3, completion based upon automatically prompted phrases, if selected, will be a complete, valid query phrase.

One benefit of providing prompting with a complete, valid query phrase is that a user who selects the prompting is always left with a completely valid query phrase that upon evaluation will give a valid result. Another benefit is that the user is able to read an entire phrase and can better understand what the different choices mean. As a result, the user can readily modify a phrase to further adapt it to indicate the desired query.

The terms in the syntactical prompts are based upon information in the database or information about prior database activities. In some implementations, the information is weighted to make the prompted completions more intuitive, as described below in greater detail. In contrast, conventional database systems rely at most on a simple pre-made list of possible completion words.

Once a query has been selected, it can be edited by a user to make a new query. Chunk expression languages lend themselves to user modification. A user can easily understand that if "show all email whose sender='john'" produces email from John, then changing the word "john" to "sean" will produce email from Sean. Users can make these modifications even if they do not know the syntax of the language well enough to correctly write the expression themselves from a blank line. FIGS. 4-7 illustrate such structured query editing according to the present invention.

Figure 4:
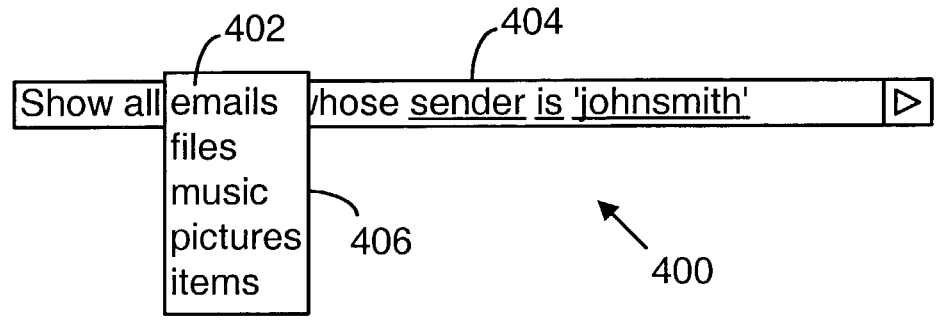
FIG. 4 is an illustration of a user interface to provide structured query editing.

FIG. 4 is an illustration of a user interface 400 to provide structured query editing. A user selects (e.g., clicks on) a word or phrase 402 (e.g., email) in an existing query 404 (e.g., "show all email whose sender is 'john'") and is provided a list 406 of all possible other completions for that word or phrase (e.g., email, files, music, pictures, items). User interface 400 uses the same prompting mechanism described above with reference to FIGS. 2 and 3.

Figure 5:
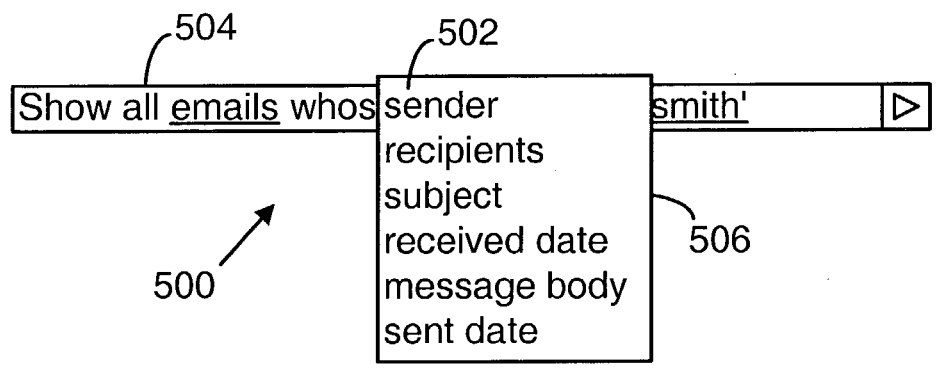
FIG. 5 is an illustration of another user interface to provide structured query editing.

FIG. 5 is an illustration of another user interface 500 to provide structured query editing. A user selects (e.g., clicks on) a word or phrase 502 (e.g., sender) in an existing query 504 (e.g., "show all email whose sender is 'john'") and is provided a list 506 of all possible other completions for that word or phrase in the context of the preceding portion of the query. As a result, list 506 includes terms (e.g., sender, recipient, subject, received date, message body, sent date) that are consistent with the query segment "show all email whose . . . " User interface 500 uses the same prompting mechanism described with reference to FIGS. 2 and 3.

Figure 6:
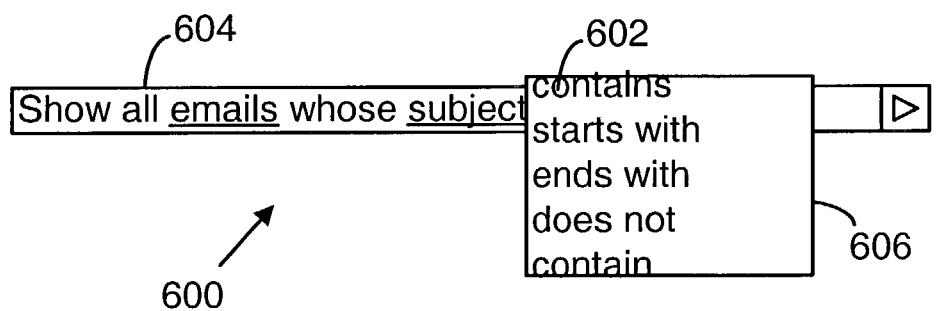
FIG. 6 is an illustration of yet another user interface to provide structured query editing.

FIG. 6 is an illustration of another user interface 600 to provide structured query editing. A user selects (e.g., clicks on) a word or phrase 602 (e.g., contains) in an existing query 604 (e.g., "show all email whose subject contains 'xyzcorp'") and is provided a list 606 of all possible other completions for that word or phrase in the context of the preceding portion of the query. As a result, list 606 includes terms (e.g., contains, starts with, ends with, does not contain) that are consistent with the query segment "show all email whose subject . . . " User interface 600 uses the same prompting mechanism described with reference to FIGS. 2 and 3.

Figure 7:
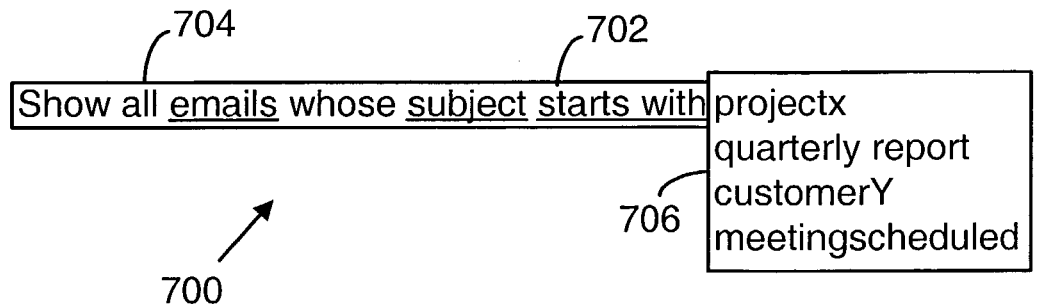
FIG. 7 is an illustration of still another user interface to provide structured query editing.

FIG. 7 is an illustration of another user interface 700 to provide structured query editing. A user selects (e.g., clicks on) a word or phrase 702 (e.g., ProjectX) in an existing query 704 (e.g., "show all email whose subject starts with") and is provided a list 706 of possible other completions for that word or phrase in the context of the preceding portion of the query. As a data term in the query, list 706 includes terms that are consistent with the query segment "show all email whose subject starts with . . . ," as retrieved from the database itself. As a result, list 706 includes terms (e.g., project X, quarterly report, customer Y, meeting scheduled, . . . ) corresponding to the beginnings of the subjects of recent emails stored in the database, accessed from it, etc.

Conventional database query systems would be unable to provide a list of terms taken from the database. Instead, a conventional database query system might insert a placeholder like "sender is <person-name>", which is not syntactically valid.

Another aspect of the present invention is that queries such as those described with reference to FIGS. 2-7 are objects that are stored or persisted in the database, complete with the history of how they were constructed. Such persisted object-oriented queries are distinct from conventional database systems, which either do not record queries at all or store them as a simple text string.

Figure 8:
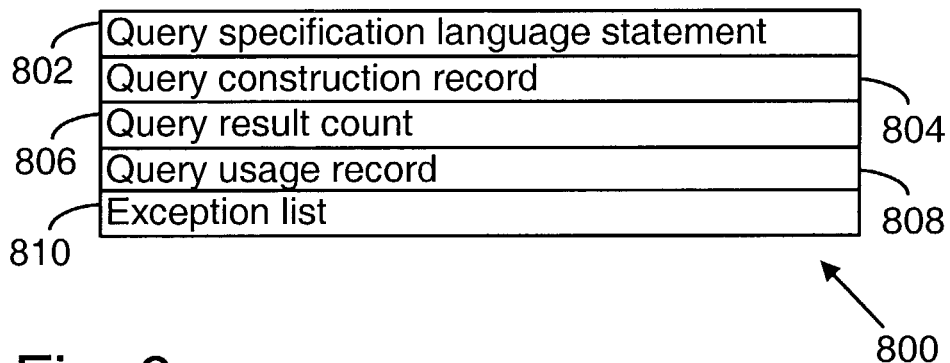
FIG. 8 is a schematic diagram of a persistent query object data structure.

FIG. 8 is a schematic diagram of a persistent query object data structure 800. A query specification language statement 802 corresponds to the actual query specification language statement (e.g., a SQL string) of the executed query, as generated from the chunk expression language format, for example. A query construction record 804 stores the user actions that produced the executed query. For example, query construction record 804 could store user actions or selections, such as those illustrated in FIGS. 2-7. A query result count 806 stores the number of results that the query returned the last time it was executed. A query usage record 808 records a history of the usage of the query, including when the query was issued and in what context. An exception list 810 list of exceptions specified to that query, as described below in greater detail.

Persistent query object data structure 800 allows queries to be constructed once and easily reused, thereby facilitating re-use of the query to enable users to repeat common queries. Such persisted queries may be listed by their chunk expression language format, or any other distinguishing characteristic, and activated from the user interface listing. In addition, such re-use of the queries allows them to be refined to provide improved query results for the user.

Figure 9:
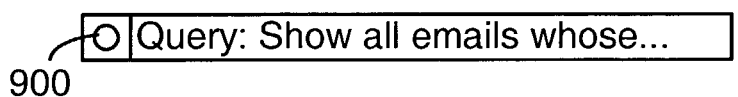
FIG. 9 is an illustration of a query status user interface for indicating status of a query.

FIG. 9 is an illustration of a query status user interface 900 for indicating status of a query. Query status user interface 900 is indicated as a color-coded "light" (e.g., rendered as a solid circle) that is rendered at, on, or adjacent to the results of a selected query. Query status user interface 900 is rendered with a color that indicates a status of the selected query. It will be appreciated that query status user interface 900 could be implemented in many different ways.

As one implementation, query status user interface 900 can be rendered with a green color to indicate that the selected query is valid (i.e., the results shown are the same results that would be generated if the query were executed again immediately), a yellow color to indicate that the selected query is out of date (i.e., the results would be different if the query would be executed at this moment), a red color to indicate that the query is invalid (i.e., the query has not been executed), or a flashing yellow color to indicate that the selected continuously updating (i.e., the current query results will be changed whenever the database changes).

Query objects can also help users distinguish between modifying an existing query and specifying a new one. As an object, a query can be represented on the screen with a unique name, a history, query text, etc., thereby allowing for a clear distinction between when the property of a query is being changed versus when a new query is being defined.

An exception list, such as an exception list 810 included in data structure 800, is a listing of one or more modifications (e.g., additions or deletions) a user makes to the results of a query. These modifications may be persisted as exception list 810. It will be appreciated that in the exception list it is the query results that is modified by the user rather than the query specification itself.

As an example, a user might be constructing a play list of music files. The user might start by specifying a query for music, such as "show all music whose decade='80s' and whose genre='modern rock' and whose ranking>4". This might produce an initial list of 200 songs, for example. The user might then add a few songs that do not match the query and remove a few songs that match but that the user personally dislikes.

The exception list, separate from the query but persisted with it, allows a user to have direct and simple manipulation of query results without having to define a valid query to achieve the modified results. The exception list is a property of the query that is separate from the query specification. A user can change one without affecting the other.

Some prior systems will force a query with exceptions to be valid by adding or removing properties from the added or removed items to make them comply with the query. For example, adding or removing a picture from a "my favorite pictures" query will add or remove the "favorite" property of those pictures. While this is sometimes desirable, it often leads to unexpected behavior. For instance, in such a system adding a song from the 90's to a list of query results from the 70's would cause the son to be retagged as being from the 70's. With more complicated queries, the confusion is even greater. Because of this increased complexity, the user interfaces for these systems require excessive additional prompting, confirming, and explaining.

In some other prior systems, adding or removing an item from the query results invalidates the query and turns it into a simple list of items. The problem with this approach is that the user is forced to construct a correct query before any modifications are made. If the query is later modified, the user's earlier query result modifications are lost. For instance, a user might search for songs between 1970 and 1980, then remove a few songs the user dislikes. The user then may notice that some desired songs are missing because they are actually from the late 60's. If the user changes the query then to show songs from 1965 to 1980, all of the songs removed from the prior query results will be reinserted again.

Implementing the exception list as a property of the query separate from the query specification allows the exception list to be changed without affecting the query specification. Likewise, the query specification can be changed without affecting the exception list.

The issue of exceptions can be of particular significance in systems where the user expects to have the ability to directly manipulate the results of a query. An example is a file system that is based upon a database structure. Most users of a file system are accustomed to "drag and drop operations" and would be intolerant of conventional database system restriction to modifications. To accommodate such users, the exception list can be modified with direct user manipulations (e.g., "drag and drop") of objects. Direct user manipulations are recorded as changes to the query exception list.

Figure 10:
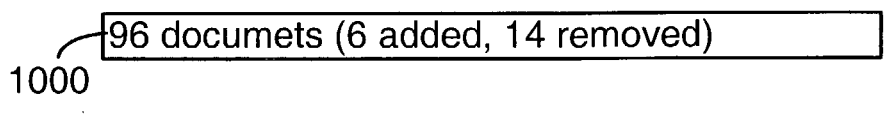
FIG. 10 is an illustration of a query modification user interface for indicating exceptions to the results of a query.

FIG. 10 is an illustration of a query modification user interface 1000 (e.g., a status bar) for indicating the exceptions of modifications to the query results (e.g., 96 documents total, 6 documents added, 14 removed). Query modification interface 1000 could be rendered with the net results (e.g., 96 documents). User selection of (e.g., clicking on) query modification interface 1000 could list the exceptions, offer choices for undoing them, etc. As a result, many types of query results, from file searches to play lists to favorite images to unread email, can be represented with a single consistent user interface experience.

Representing queries as objects also allows for support of so-called "empty queries". An empty query is a query that exists despite having no results. For example, a user can create a query for airfares from Seattle to China for under $600. This query might have no results the first time it is run, but the user still may want to save it to run in the future, or on a regular basis. If queries are not objects but are just query results, this is not possible.

Query objects also allow for queries that have no query specification, but rather are composed only of one or more exceptions or exception lists. For instance, a user could make a query called "stuff I need to complete for manager" that has no search string at all. The user could then add any number of items (e.g., documents) as exceptions to that query. The only things that this query would return are those items that are explicitly added. This allows for hand-made lists to be treated with the exact same code and user interface as queries. It also makes for an easy migration path from non-query based systems (such as the traditional folder hierarchy of file management systems) to query-based systems.

Figure 11:
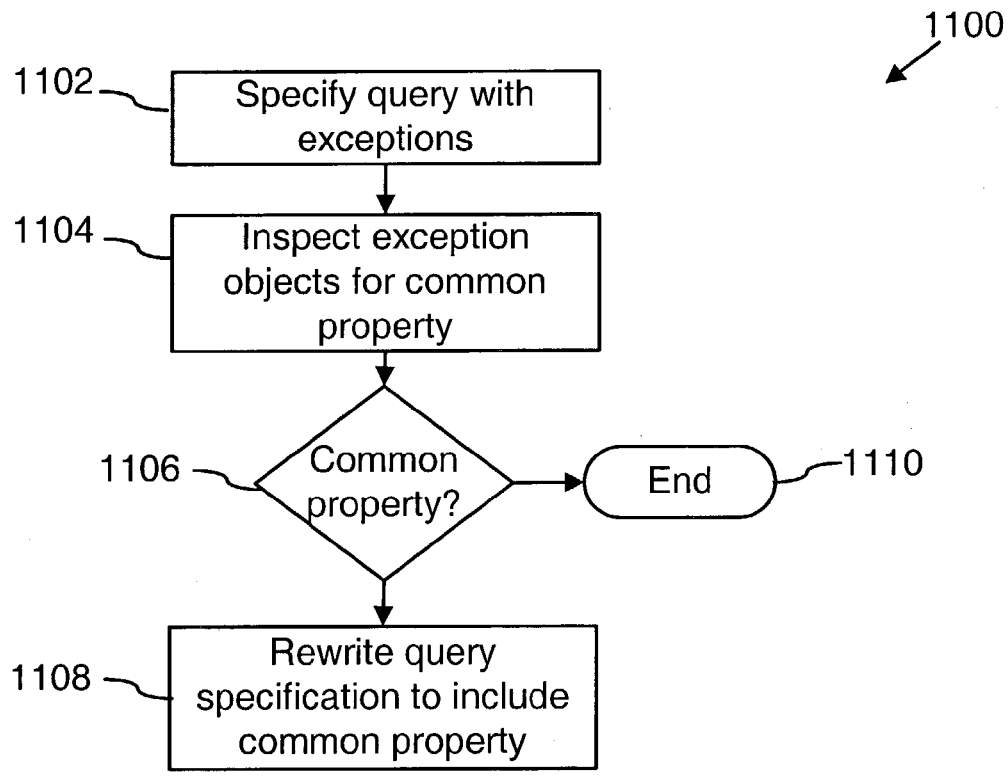
FIG. 11 is a flow diagram of an automated query re-write method to create queries automatically by making a simpler query and adding exceptions.

FIG. 11 is a flow diagram of an automated query re-write method 1100 that can help users create queries automatically by making a simpler query and adding exceptions. Users often make query exceptions because they are unable to construct the more complicated queries that would return the desired results. Automated query re-write method 1100 creates a query specification that will generate the same results but with no exceptions.

In step 1102 a user specifies or modifies a query with exceptions.

In step 1104 objects that are added or removed as exceptions are inspected to determine whether they have one or more common properties.

In decision block 1106 an inquiry is made as to whether the exception objects have one or more common properties. If the exception objects have one or more common properties, decision block 1106 proceeds to step 1108. If not, decision block proceeds to termination block 1110 and the exception objects are maintained as an exception list.

In step 1108 the query specification is rewritten to include reference to the common properties, and the exception list is recalculated. As a result, the query will generate the same results but without the system overhead of the exceptions. The query will be more accurate and thus more appropriate for reuse in the future.

For example, a user may want a list of work emails from a manager. The user gets a list of email from Manager, but notices that personal emails are included in the initial list. The user might not know how to write a more complicated query that will just show the work emails, so the selects the personal emails from the list and deletes them.

Figure 12:
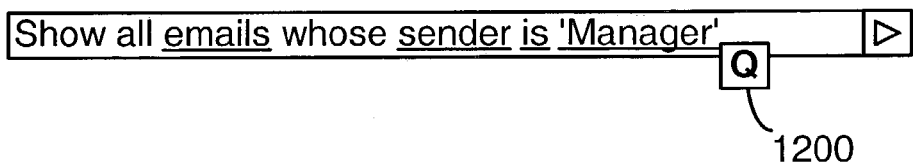
FIG. 12 is an illustration of an auto-rewrite user interface affordance or indication.

In accordance with automated query re-write method 1100, the user interface then inspects those exceptions and produces an auto-rewrite user interface affordance or indication 1200 (FIG. 12) to show that a rewrite is possible. As illustrated, auto-rewrite user interface affordance 1200 includes the letter Q in a box and indicates that a rewrite is suggested to remove the 14 removed items. It will be appreciated that any symbol or affordance could be used.

Figure 13:
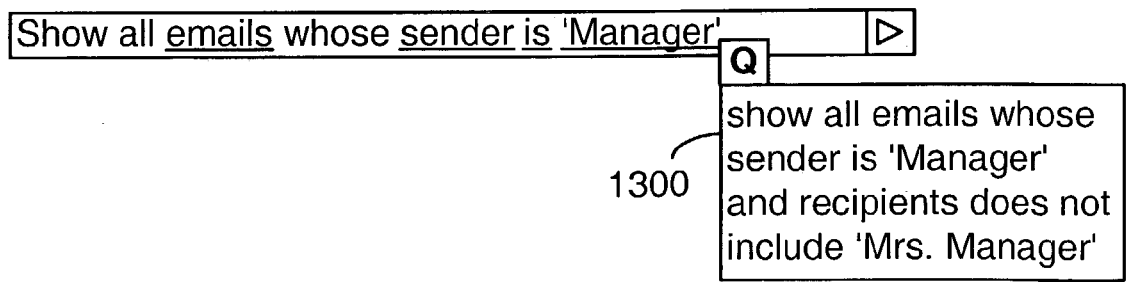
FIG. 13 is an illustration of an auto-rewrite user interface affordance showing a suggested rewrite.

This type of prompting is meant to be non-invasive. It is not necessary for the user to respond to it. If curious about the re-write, the user can move the mouse over the auto-rewrite user interface affordance 1200, for example, to see the suggested rewrite 1300 (FIG. 13). FIG. 14 illustrates a modified query 1400 incorporating a suggested rewrite.

In this case, the user interface noticed that all of the removed emails were also sent to Mrs. Manager, Manager's wife. The ability to inspect the query in a lightweight way is made possible by the highly readable nature of the chunk expression language. This type of preview allows the user to prevent inadvertent coincidences from being incorporated into the query specification. For example, when making a playlist, the user might remove a several disliked songs. All of the songs might happen to be from a particular record label, and the user interface might suggest the record label characteristics as a rewrite. In case of inadvertent coincidence the user would not accept the rewrite.

In addition, automated query re-write method 1100 can optionally effect changes to the underlying properties of the objects. For instance, when pictures are discarded from a "favorites" list, the user interface could suggest removing the "favorites" property from those objects. Again, this could be done in a light-weight, non-intrusive fashion.

FIG. 15 is an illustration of a grammatical query autocomplete (GQA) user interface 1500 that combines the ease of full-text search with the expressive power and accuracy of a full query specification language. From the user's point of view, it is very simple: a user types a few words and the user interface automatically returns a list of full query strings that are likely matches to those words. In FIG. 15, for example, a user enters a partial query string 1502 (e.g., "John XYZ-Corp", and the user interface automatically provides a grammatical query autocomplete listing 1504 that suggests "show all email whose sender is 'john smith' and whose subject contains 'XYZCorp,'" "show all email whose sender is 'john jones' and whose subject contains 'XYZCorp,'" "show all objects referencing 'john smith' and 'XYZCorp,'" "show all pictures referencing 'john smith' and 'XYZCorp,'" "show all objects referencing 'john' and 'XYZCorp'."

In contrast to the grammatical query autocomplete (GQA) feature, a conventional prior system with "John XYZCorp" entered as a query would perform a full-text search of the entire database for items that contain either "john" or "XYZCorp", or perhaps contain both "john" and "XYZCorp". In either case, the full-text search would likely return significantly more results than the user needs or wants.

The problem with conventional prior default query is that while the user has a definite goal in mind (such as "I want the email from john about xyxcorp" or "I want that picture of john taken at xyzcorp"), the user often does not know how to correctly specify such an expression to the computer. The grammatical query autocomplete (GQA) feature leverages the readability of the chunk expression language to provide the user with a list of valid, likely completions.

FIG. 16 is a flow diagram of a grammatical query autocomplete (GQA) method 1600, which in most computer systems would be fast enough to be done as the user enters (e.g., types) types the partial query.

In step 1602, text fragments of the partial query are analyzed and each individual word is classified into an object type. For example, the text fragments are first checked against the representation of the chunk expression grammar (basically a dictionary look-up). The text fragments are then checked via a full-text search against records in the database. If the word occurs in a particular field in a database table, the object type will be determined from that table. In each of these, the user interface can match whole words or partial words, and there could be several possible object types for each word. For instance, "john pictures" could mean "show pictures of john" or "show email from john with the word pictures in the subject." The term "picture" could be an object or just a text string. Each choice is given a probability rating. There could be several rating schemes, and grammatical query autocomplete method 1600 does not depend upon any particular one. one implementation of a weighting scheme is described below.

In step 1604, the computed object types are compared with a list of all syntactically valid expressions that use those parts of speech. In the "john xyzcorp" example, the user interface will classify "john" as both a text string and as a possible value for the "name" field of a person record. "xyzcorp" is a text string, a possible value for the "name" field of a place record, and a possible value for the "subject" field of an email record. Based on this, the user interface will look for syntactically correct statements that incorporate a person and a place, a person and an email, etc. All of these possibilities are then also assigned weights, as in step 1602.

In step 1606, the text string is compared to other text strings that have been passed in for autocompletion using simple string matching. For example, the user might type "john xyzcorp" and then select the "show email from john about xyzcorp" completion. If the user later starts typing "jo", then the "jo" will match the previously entered "john xyzcorp" string, and the user interface will add the previously chosen completion "show email from john about xyzcorp" to the list of matches. The list of matches is then combined with the results of step 1604. Since many people do the same queries over and over again, this step reduces most common queries to just three or four key strokes.

In step 1608, the final sorted, weighted list is then displayed to the user.

Figure 17:
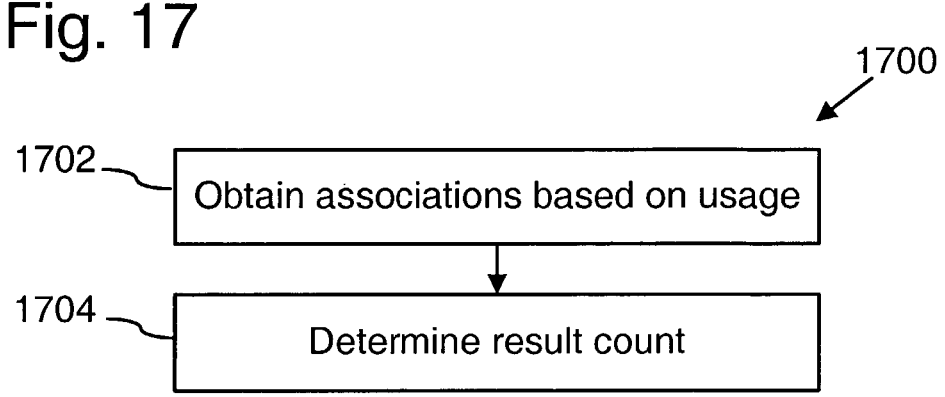
FIG. 17 is a flow diagram of a query weighting and sorting method for weighting and sorting the results returned from internal queries.

FIG. 17 is a flow diagram of a query weighting and sorting method 1700 for weighting and sorting the results returned from the internal queries. A step 1702 obtains associations based on historical/contextual usage, and a step 1704 determines a result count to order the items in the list so that the completion the user wants is almost always among the top few (e.g., seven) presented. This query result ranking scheme enhances the operation of the user interface features described.

In step 1702, the user interface remembers when a proposed completion is selected by creating an association object, which shows that the prompt and the completion are related. The user interface then uses these associations to increase the weighting of that completion in the future. If the user chooses "john" from a list of "People", John will be weighted more towards the top of the list in the future.

Moreover, the association object can handle the deep associations in complex completions. For example, if a user enters "john disney", the completion "show pictures where subject contains 'john smith' and location is 'disneyland'" might be low on the list. Once the user selects it, however, the user interface will not only associate "john disney" with "show pictures where subject contains 'john smith' and location is 'disneyland'", the user interface will also associate "john" with the person named 'john smith' and "disney" with the place named 'disneyland'. It will associate both john and disneyland with photos, and it will even associate phrases consisting of a person and a place as being likely about photos. In the future if the user types something like "dave disney" or "mike grand canyon", completions that contain pictures will be given more weight.

In step 1704 the number of results is taken into account when weighting a result. In general, results might follow a curve like a Bell curve, where "more results" becomes better up to a point, then there are so many results that it actually becomes not specific enough. For instance, if the user types "b mail", the user interface might suggest completions of "show email whose subject contains 'b'", "show email whose sender is Brian", and "show email whose sender is Benefits". All of these are valid completions, but the first might return 5000 items, the second might return 90 items, and the third might return 1 item. The result count metric would ensure that the second option "show email whose sender is Brian" comes to the top. This solves the common autocomplete problem of the user interface always suggesting the incorrect Dave, John, or Matt.

Because this result count weighting is done in context, it appears very intelligent. For instance, the user might have more email from manager John Smith than pictures of John Smith, and a lot of pictures of friend John Jones but relatively little email from John Jones. When the user interface completes "john pictures", "show pictures whose subject is John Jones" will be the first choice, but for "john email", "show email whose sender is 'john smith'" will be first.

Different implementations may contain different selections, object types, properties, and comparators than those described hereinabove. The present invention is not limited to any particular implementation and applies to any database format, query language specification, etc.

In accordance with the practices of persons skilled in the art of computer programming, the present invention is described above with reference to acts and symbolic representations of operations that are performed by various computer systems and devices. Such acts and operations are sometimes referred to as being computer-executed and may be associated with the operating system or the application program as appropriate. It will be appreciated that the acts and symbolically represented operations include the manipulation by a central processing unit (CPU) of electrical signals representing data bits, which causes a resulting transformation or reduction of the electrical signal representation, and the maintenance of data bits at memory locations in a memory system, such as a computer readable medium, to thereby reconfigure or otherwise alter the computer system operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. A database query user interface for forming a database query for a database, comprising:
   a first syntactical prompt, provided by a processor, for constructing an initial portion of a database query in a chunk expression language format, the database query including a query construction record identifying user actions that produced the database query;
   a second syntactical prompt, provided by the processor, for constructing a second portion of the database query in the chunk expression language format, the second portion comprising a multi-element chunk expression language syntactic group that completes a syntactically correct expression for the database query, the second syntactical prompt including a text string corresponding to information in the database, the text string selected from the database based upon a weighted analysis of database information relating to database elements included in at least a portion of the database query, the weighted analysis of database information including a result count factor that increases weight to information that increases results up to a maximum count and decreases the weight to the information for a portion of the results that exceed the maximum count, the chunk expression language resulting in the database query being syntactically correct, the chunk expression language enabling creation of an empty query that when executed at a first time yields no results but when executed at a second time yields one or more results;

a list of exceptions to the database query; and a query status user interface, provided by the processor, to indicate whether the database query is valid or invalid.

2. The user interface of claim 1 in which the weighted analysis of database information includes a completion association in which first and second information items are associated together in a syntactical prompt selected by the user, thereby increasing a weight of a relationship between the first and second information items relative to other information items.

3. The user interface of claim 1 in which the second syntactical prompt includes an information field identifier corresponding to a selected information field in the database, the text string being included in the selected information field.

4. The user interface of claim 1 in which the first syntactical prompt displays a plurality of user-selectable terms for constructing at least a portion of the database query.

5. The user interface of claim 1 in which the second syntactical prompt displays a plurality of user-selectable syntactic groups that each completes a syntactically correct expression for at least a portion of the database query.

6. The user interface of claim 5 in which individual elements in a multi-element syntactic group are modifiable while maintaining a syntactically correct expression for the database query.

7. The user interface of claim 1 in which the database query is persisted as a database query object in a computer readable medium.

8. The user interface of claim 7 in which the database query object includes a data structure having an exception list of exceptions to the database query, the exception list specified by a user.

9. The user interface of claim 8 in which the data structure of the database query object further includes a query result count of how many results are returned from the database in response to the database query.

10. The user interface of claim 8 in which the data structure of the database query object further includes a query usage record indicating a history of usage of the database query.

11. The user interface of claim 7 in which the database query is retrievable from the persisted database query object for execution against the database.

12. A system comprising one or more processors and a memory device storing instructions that are executable by the one or more processors to display a database query user interface for forming a database query for a database, the database query user interface comprising:

a text string input received from a user, by a processor, the text string input including one or more terms of a chunk expression language;

a first syntactical prompt, provided by the processor, for constructing a database query using multiple elements of the chunk expression language, the database query formed such that the database query is syntactically correct and complete, the database query including the text string input, the database query including a query construction record identifying user actions that produced the database query;

a second syntactical prompt, provided by the processor, for constructing a second portion of the database query in the chunk expression language format, the second portion comprising a multi-element chunk expression language syntactic group that completes a syntactically correct expression for the database query, the second syntactical prompt including a text string corresponding to information in the database, the text string selected from the database based upon a weighted analysis of database information relating to database elements included in at least a portion of the database query, the weighted analysis of database information including a result count factor that increases weight to information that increases results up to a maximum count and decreases the weight to the information for a portion of the results that exceed the maximum count, the chunk expression language resulting in the database query being syntactically correct, the chunk expression language enabling creation of an empty query that when executed at a first time yields no results but when executed at a second time yields one or more results;

a user-specified list of exceptions to the database query; and a query status, provided by the processor, that indicates a status of the database query.

13. The system of claim 12 in which the weighted analysis of database information includes a completion association in which first and second information items are associated together in a syntactical prompt, thereby increasing weight of a relationship between the first and second information items relative to other information items.

14. The system of claim 12 in which the second syntactical prompt includes an information field identifier corresponding to a selected database information field that includes the text string input.

15. The system of claim 12 in which the second syntactical prompt displays a plurality of database queries from which the user selects the database query, each of the plurality of database queries constructed using the chunk expression language.

16. The system of claim 15 in which individual elements in the database query are modifiable by the user syntactically correct expression for the database query.

17. The system of claim 12 in which the database query is persisted, by the processor, as a database query object in a computer readable medium.

18. The system of claim 12 in which the data structure of the database query object further includes a query result count indicating a number of results returned by the database query.

19. The system of claim 12 in which the data structure of the database query object further includes a query usage record indicating a history of usage of the database query.

20. The system of claim 17 in which the database query is retrievable from the persisted database query object, by the processor, for renewed execution against the database.

21. The system of claim 17 in which:

the database query object includes a data structure having an exception list of exceptions to the database query, the exception list specified by the user, and the user interface to automatically generate a revised database query in the chunk expression language format, the query taking into account the exceptions in the exception list.

22. The system of claim 12 in which the database query has associated with it an exception list of exceptions to the query specified by a user.

23. The system of claim 22 in which the user interface further includes automatic generation of a revised database query in the chunk expression language format with an accommodation for exceptions in the exception list.

24. The system of claim 12 in which the exception list of exceptions to the query specified by a user can be modified with direct user manipulations of objects.

25. A computer readable medium storing software instructions while excluding carrier signals, the software instructions executable by one or more processors to perform acts comprising:
displaying a first syntactical prompt to construct an initial portion of a database query in a chunk expression language format, the database query including a query construction record identifying user actions that produced the database query;
displaying a second syntactical prompt to construct a second portion of the database query in the chunk expression language format, the second portion comprising a multi-element chunk expression language syntactic group that completes a syntactically correct expression for the database query, the second syntactical prompt including a text string corresponding to information in the database, the text string selected from the database based upon a weighted analysis of database information relating to database elements included in at least a portion of the database query, the weighted analysis of database information including a result count factor that increases weight to information that increases results up to a maximum count and decreases the weight to the information for a portion of the results that exceed the maximum count;
forming the database query in the chunk expression language based on the first syntactical prompt and the second syntactical prompt, the chunk expression language resulting in the database query being syntactically correct, the chunk expression language enabling creation of an empty query that when executed at a first time yields no results but when executed at a second time yields results;
storing the database query in a persistent database query object; and
storing, in the persistent database query object, an exception list of exceptions to the database query, the exception list specified by a user.

26. The computer readable medium of claim 25 further including software executable by the one or more processors for obtaining user-specified exceptions with reference to results returned by the database query.

27. The computer readable medium of claim 25 further comprising software executable by the one or more processors for automatic generation of a revised database query in the chunk expression language format with an accommodation for exceptions in the exception list.

28. The computer readable medium of claim 25 in which the version of the database query includes a query specification language statement corresponding to the database query in the chunk expression language format.

29. The computer readable medium of claim 25 in which the persistent database query object further includes a query construction record identifying user actions used to create the database query.

30. The computer readable medium of claim 25 in which the persistent database query object further includes a query result count of how many results are returned by the database query.

31. The computer readable medium of claim 25 in which the persistent database query object further includes a query usage record indicating a history of usage of the database query.

32. The computer readable medium of claim 25 further comprising software executable by the one or more processors for renewing execution of the database query against the database from the persistent database query object.

33. The computer readable medium of claim 25, further comprising:
displaying a status of the database query, the status indicating whether the database query is valid or invalid.

34. The computer readable medium of claim 25, in which the second syntactical prompt includes an information field identifier corresponding to a selected database information field that includes the initial query text string.

35. The computer readable medium of claim 25, in which the second syntactical prompt includes a displayed listing of plural multi-element chunk expression language database queries, a user selecting one of the plural multi-element chunk expression language database.

36. The computer readable medium of claim 35 in which individual elements in the multi-element chunk expression language database query can be modified by the user, each from a displayed list of elements that can replace the individual element and maintain the syntactically correct expression for the database query.

37. A method, comprising:
under control of one more processors configured with specific executable instructions to perform acts comprising:
displaying a first syntactical prompt to construct an initial portion of a database query in a chunk expression language format, the database query including a query construction record identifying user actions that produced the database query;
displaying a second syntactical prompt to construct a second portion of the database query in the chunk expression language format, the second portion comprising a multi-element chunk expression language syntactic group that completes a syntactically correct expression for the database query, the second syntactical prompt including a text string corresponding to information in the database, the text string selected from the database based upon a weighted analysis of database information relating to database elements included in at least a portion of the database query, the weighted analysis of database information including a result count factor that increases weight to information that increases results up to a maximum count and decreases the weight to the information for a portion of the results that exceed the maximum count;
forming the database query in a chunk expression language such that the database query is syntactically correct regardless of whether the database query yields no results;
storing the database query in a persistent database query object; and storing, in the persistent database query object, an exception list of exceptions to the database query, the exception list specified by a user.

38. The method of claim 37 further including obtaining user-specified exceptions with reference to results returned by the database query.

39. The method of claim 37 further including automatically generating a revised database query in the chunk expression language format with an accommodation for exceptions in the exception list.

40. The method of claim 37 in which the version of the database query includes a query specification language statement corresponding to the database query in the chunk expression language format.

41. The method of claim 37 in which the persistent database query object further includes a query result count of how many results are returned by operation of the database query.

42. The method of claim 37 in which the persistent database query object further includes a query usage record indicating a history of usage of the database query.

43. The method of claim 37 further including renewing execution of the database query against the database from the persistent database query object.

44. The method of claim 37, in which the second syntactical prompt is selected from the database based upon a weighted analysis of database information relating to database elements included in the initial query text string.

45. The method of claim 37, in which the syntactical prompt includes an information field identifier corresponding to a selected database information field that includes the initial query text string.

46. The method of claim 37, in which the syntactical prompt includes a displayed listing of plural multi-element chunk expression language database queries, a user selecting one of the plural multi-element chunk expression language database.

47. The method of claim 46 in which individual elements in a multi-element chunk expression language database query can be modified by the user, each from a displayed list of elements that can replace the individual element and maintain the syntactically correct expression for the database query.

* * * * *